(12) United States Patent
Schlegel et al.

(10) Patent No.: US 7,701,999 B1
(45) Date of Patent: Apr. 20, 2010

(54) NON-COHERENT MULTIUSER RECEIVER AND METHOD FOR AIDING CARRIER ACQUISITION IN A SPREAD SPECTRUM SYSTEM

(75) Inventors: Christian Schlegel, Park City, UT (US); Samuel C. Kingston, Salt Lake City, UT (US); Thomas R. Giallorenzi, Riverton, UT (US); Michael Rice, Provo, UT (US); June Sun, Salt Lake City, UT (US)

(73) Assignee: L3 Corrections Corporation, New York, NY (US)

( * ) Notice: Subject to any disclaimer, the term of this patent is extended or adjusted under 35 U.S.C. 154(b) by 952 days.

(21) Appl. No.: 11/416,656

(22) Filed: May 2, 2006

(51) Int. Cl.
*H04B 1/00* (2006.01)

(52) U.S. Cl. .................. 375/144; 375/148; 375/346; 455/501; 455/63.1; 455/296

(58) Field of Classification Search .............. 375/144, 375/148, 270, 277, 285, 321, 346, 347, 326; 455/501, 63.1, 65, 67.13, 67.11, 200, 296
See application file for complete search history.

(56) References Cited

U.S. PATENT DOCUMENTS

| | | | | |
|---|---|---|---|---|
| 5,694,389 A | * | 12/1997 | Seki et al. | 370/208 |
| 5,761,250 A | * | 6/1998 | Lin | 375/344 |
| 6,172,970 B1 | * | 1/2001 | Ling et al. | 370/347 |
| 7,031,402 B2 | * | 4/2006 | Takada | 375/296 |
| 7,092,452 B2 | * | 8/2006 | Taylor et al. | 375/267 |
| 7,254,161 B2 | * | 8/2007 | Boloorian | 375/149 |
| 7,266,168 B2 | * | 9/2007 | Kwak et al. | 375/347 |
| 7,389,099 B2 | * | 6/2008 | Cozzo et al. | 455/295 |
| 7,418,248 B2 | * | 8/2008 | Maeda et al. | 455/203 |

* cited by examiner

*Primary Examiner*—Dac V Ha
(74) *Attorney, Agent, or Firm*—Harrington & Smith (57) ABSTRACT

Disclosed is a method for acquiring a user signal from among several received from multiple users in a single burst. The method includes receiving a plurality of user signals in a single transmission burst, suppressing multiuser interference among at least some of the plurality of received signals, and determining a carrier frequency of at least one signal from among the interference suppressed plurality of received signals. Said signals may rotate due to a lack of synchronization while being equalized. Also described is a multiuser receiver for acquiring at least one user signal from among several user signals received from multiple users in a single burst. An antenna is for receiving a plurality of user signals in a single spread spectrum transmission burst, a matched filter is for despreading the signals, a multiuser equalizer is for suppressing mutual interference among at least a portion of the plurality of user signals, and a carrier lock circuit is for determining a carrier frequency of at least one user signal of the portion.

18 Claims, 10 Drawing Sheets

| FIG.2A | FIG.2B | FIG.C | FIG.2D |
| FIG.2E | FIG.2F | FIG.2G | FIG.2H |

NON-COHERENT MULTIUSER RECEIVER AND METHOD FOR AIDING CARRIER ACQUISITION IN A SPREAD SPECTRUM SYSTEM

FIELD OF THE INVENTION

Embodiments of the invention relates to multiuser receivers and methods in a wireless spread spectrum communication system.

BACKGROUND

To meet the need for ever-increasing information capacity in wireless communication systems, research efforts have recently turned to the physical layer to increase spectral efficiency. One aspect of this research relevant to certain embodiments of this invention is in the area of multiuser receivers. These receivers seek to minimize interference between mutual users of a spread spectrum wireless system, and generally include multiuser detectors, linear decorrelators, and linear minimum mean-square-error (MMSE) receivers. An important distinction between multiuser receivers and their matched-filter counterparts is that multiuser receivers delve into the structure of interference among different (simultaneous) users or the system in order to demodulate the signal of one particular user of interest Certain prior art receivers increase either information-carrying capacity (traditional capacity, such as defined by the Shannon limit), or user capacity, the latter being the maximum number of users for which a multiuser receiver may reliably demodulate the intended signal. For example, one type of multiuser receiver resolves multiple access interference (MAI) using knowledge of either all (conventional) or none (blind) of the interfering users, though in practice this knowledge in the receiver is incomplete. Another approach is for the multiuser receiver in an ultra-wideband system to combine energy from the multiple users at the densest portion of the multipath channel while disregarding both wideband and narrowband interference. As with much research in spread spectrum wireless communications, these appear to rely on the difference in user power levels being within a quite narrow band.

Regardless of the practical application of the above receivers to cellular communications where effective power control among users is a viable assumption, there exist wireless systems where that assumption does not hold, and where Doppler effects are so great that power control is not practical, in particular in system which transmit data in bursts. Such a system 20 is shown in FIG. 1.

Figure 1:
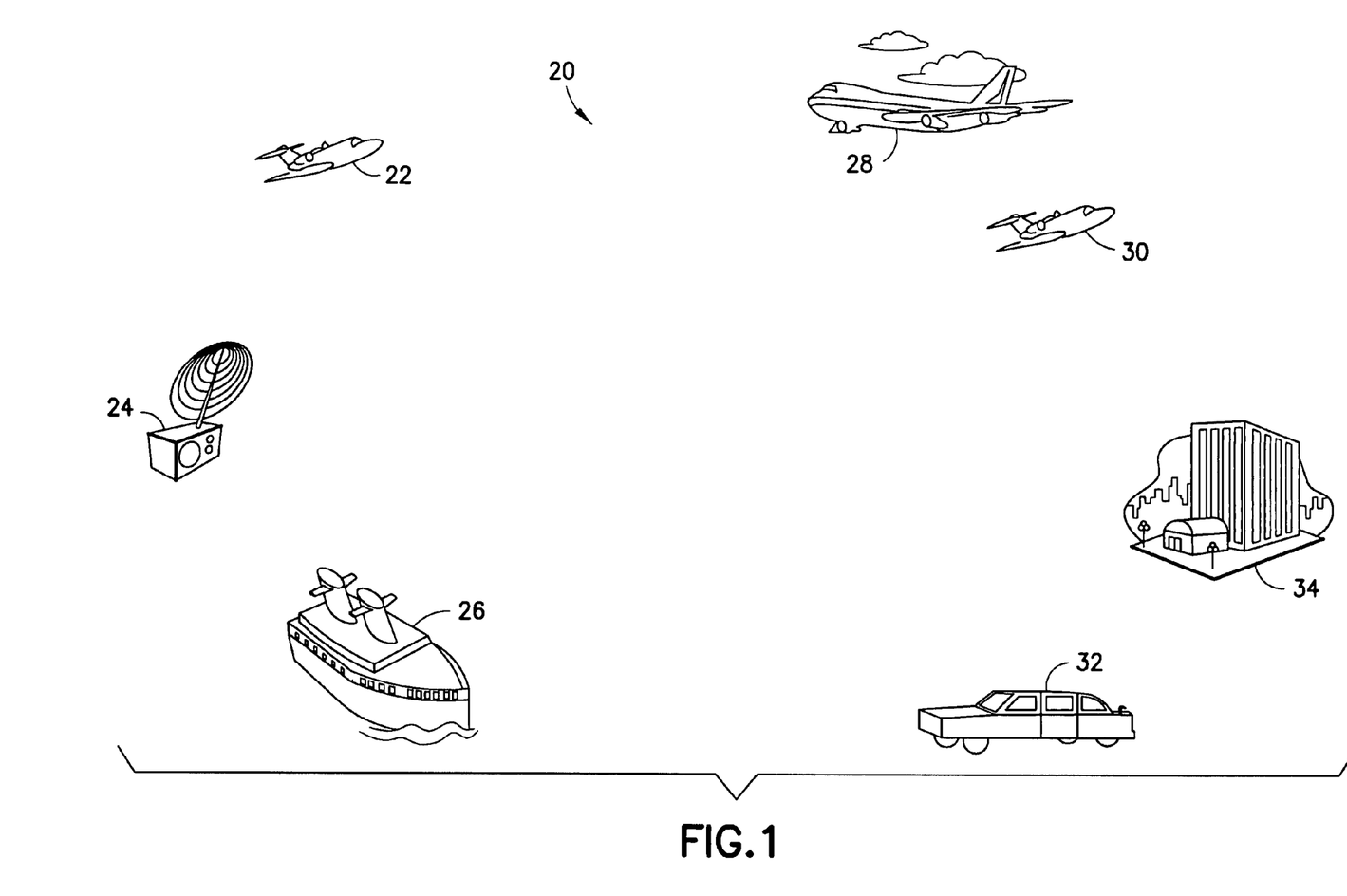
FIG. 1 is a schematic diagram of nodes in a wireless mesh network communication system.

FIG. 1 depicts a series of nodes communicating with one another over a wireless network, preferably secure. Assume a first node 22 carries a multiuser receiver, and wishes to receive communications from any of the other nodes. A second 24 and third 26 node are nearest to the first, and traditional power control may be adequate between them and the first node 22. A fourth 28 and fifth 30 nodes are located proximal to one another as compared to the first node 22, but are moving in different directions at high speed. Doppler effects are opposed and not negligible. Direct power control to the extent achieved in cellular communications is impractical for them, because each node 28, 30 changes its distance from the first node 22 rapidly, and power control cannot keep up with the spatial changes between nodes. As the fourth node 28 closes on the first node 22, its signal carries a higher power level that will obscure the signal from the fifth node 30, whose power level as seen by the first node 22 is decreasing. Traditional open/closed loop power control will lag behind the power levels of the various users seen by the first node 22, essentially blinding it to at least some of the transmissions from the other nodes.

Anticipatory power control based on expected relative position might resolve the above problem were the system 20 a cellular one. Traditional power control presumes that only a single node need receive transmissions from multiple users. In that model individual cellular users can adjust their transmission power such that all received power levels at the cellular base station are equal. But the system 20 of FIG. 1 is a mesh network, and any of the various nodes may include a multiuser receiver to receive transmissions from any other node. In that instance, anticipatory power control may work to constrain received signals to within a narrow power range for one of the nodes, but will expand, even beyond a range that would exist in the absence of power control, the power range for those same signals when they are received by other nodes (depending upon the location of those other nodes).

The above is generally termed in the art as a near-far power imbalance. In the system 20 of FIG. 1, the difference in power for various signals received at the first node 22 may be several orders of magnitude. At any given instant, the first node 22 may seek to receive a signal from what it sees as the strongest fourth node 28 and a weakest seventh node 34. A sixth node 32 may simultaneously seek to receive a signal from what it sees as an intermediate strength fifth node 30 and a weakest second node 24.

In the prior art, coherent multiuser receivers are used to resolve the different user signals. However, they have difficulty in resolving chip and carrier frequency in the presence of large multiuser interference, and often operate reliably only under high signal to noise ratios. What is needed in the art is a multiuser receiver and method that permit detection of multiple spread spectrum users even in the presence of large Doppler uncertainties, large power imbalances, and/or low signal to noise ratios.

SUMMARY OF THE INVENTION

This invention is in one aspect a method for acquiring a user signal from among several received from multiple users in a single burst. The method includes receiving a plurality of user signals in a single transmission burst, suppressing multiuser interference among at least some of the plurality of received signals, and determining a carrier frequency of at least one signal from among the plurality of received signals.

This invention is in another aspect a multiuser receiver for acquiring at least one user signal from among several user signals received from multiple users in a single burst. The receiver includes an antenna, a matched filter bank, a multiuser equalizer, and a carrier lock circuit. The antenna is for receiving a plurality of user signals in a single spread spectrum transmission burst. The matched filter bank has an input coupled to an output of the antenna, and is for despreading the signals. The multiuser equalizer has an input coupled to an output of the matched filter bank, and is for suppressing mutual interference among at least a portion of the plurality of user signals. The carrier lock circuit has an input coupled to an output of the multiuser equalizer for determining a carrier frequency of at least one user signal of the portion.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

Exemplary embodiments of the invention are described below more particularly with reference to the following drawing figures, which are not to scale except where stipulated.

DETAILED DESCRIPTION

Traditionally, multiuser coherent receiver designs relied upon the assumption that carrier lock and chip lock is achieved prior to multiuser detection. Matched filter outputs are provided to a multiuser detector for subsequent processing and data detection. To perform coherent detection, the receiver would lock to the signal from each desired user in the presence of noise, interference and Doppler shifts. The inventors have determined that such traditional multiuser receivers inherently limit their own performance by having to obtain carrier lock in the noisy interference environment.

An embodiment of the present invention uses a noncoherent multiuser receiver to suppress the multiuser interference, enabling the receiver to achieve carrier lock at a much higher signal to noise ratio than would be possible if carrier lock had to be performed prior to multiuser detection. A noncoherent multiuser receiver is one that does not require a carrier lock in order to accomplish interference suppression. Using a noncoherent receiver in these embodiments enables the novel receiver to isolate the different user signals sufficiently, enabling carrier lock to occur on the resulting equalized signal that has a much higher signal to interference plus noise ratio (SINR).

Figure 2:
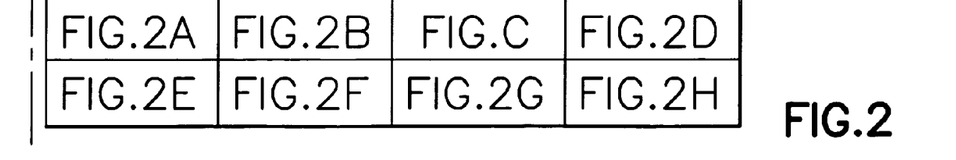
Figure 2A:
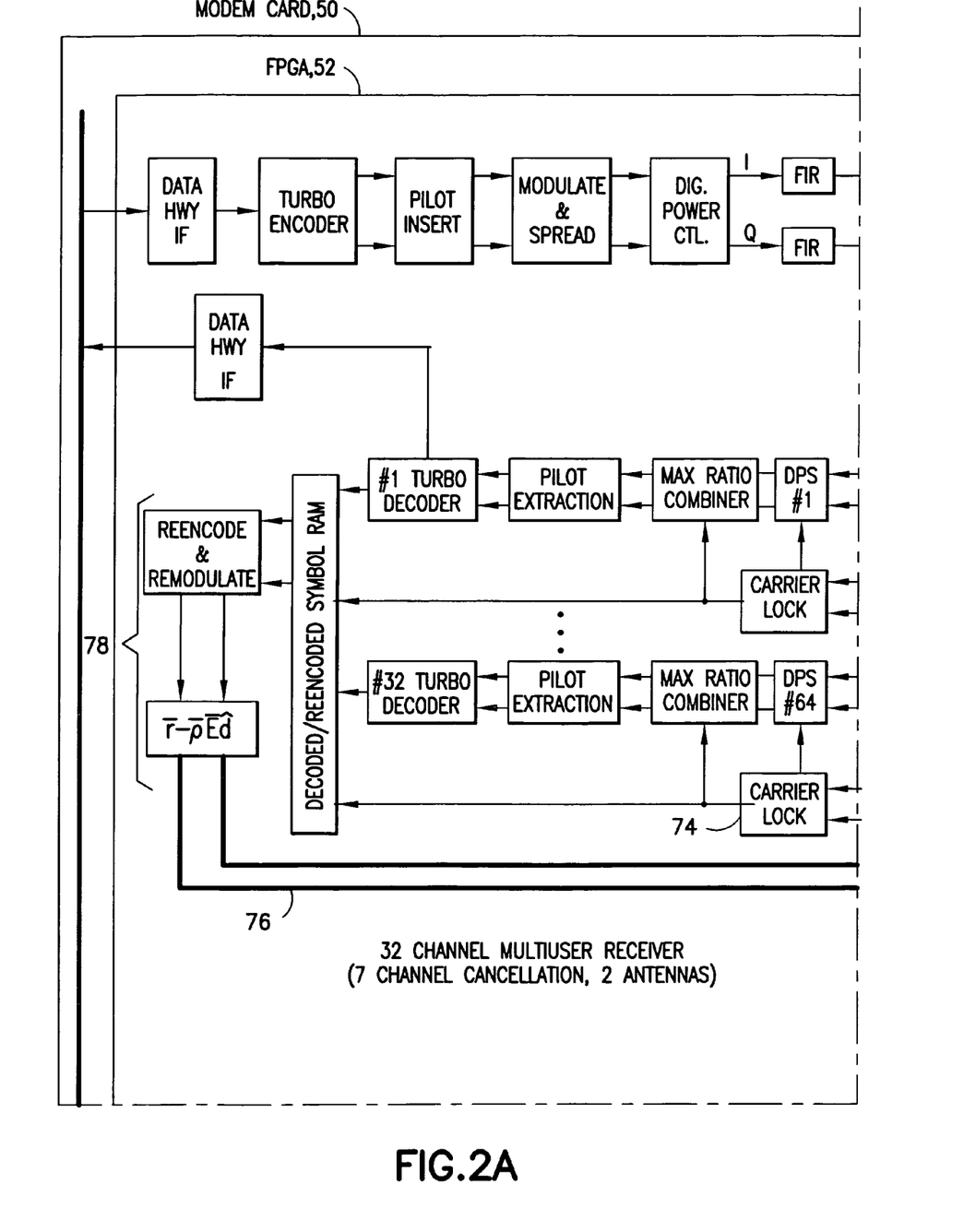
FIGS. 2A-2H, collectively referred to as FIG. 2, show a detailed block diagram of a receiver front end according to one embodiment of the present invention.
Figure 2B:
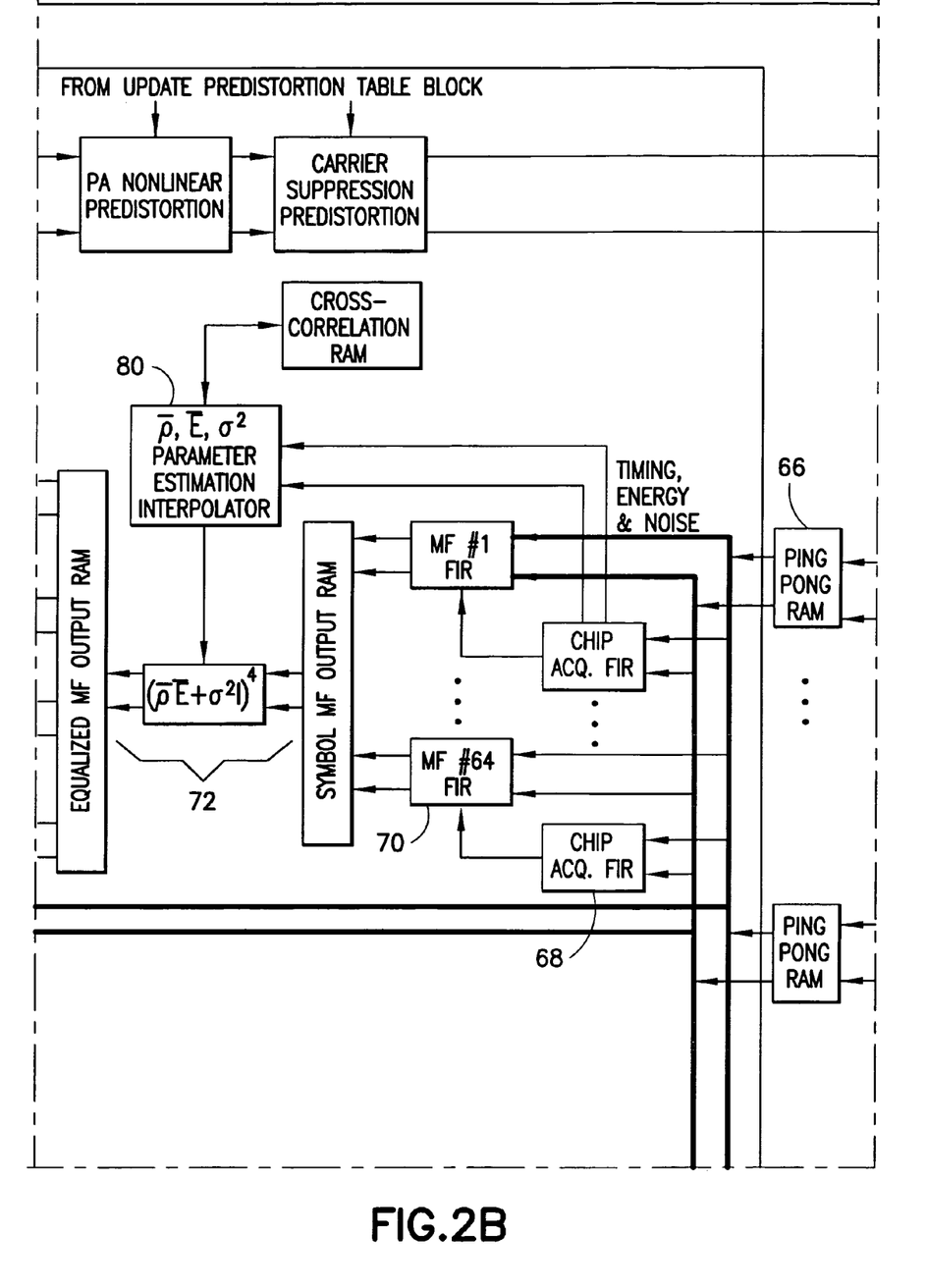
Figure 2C:
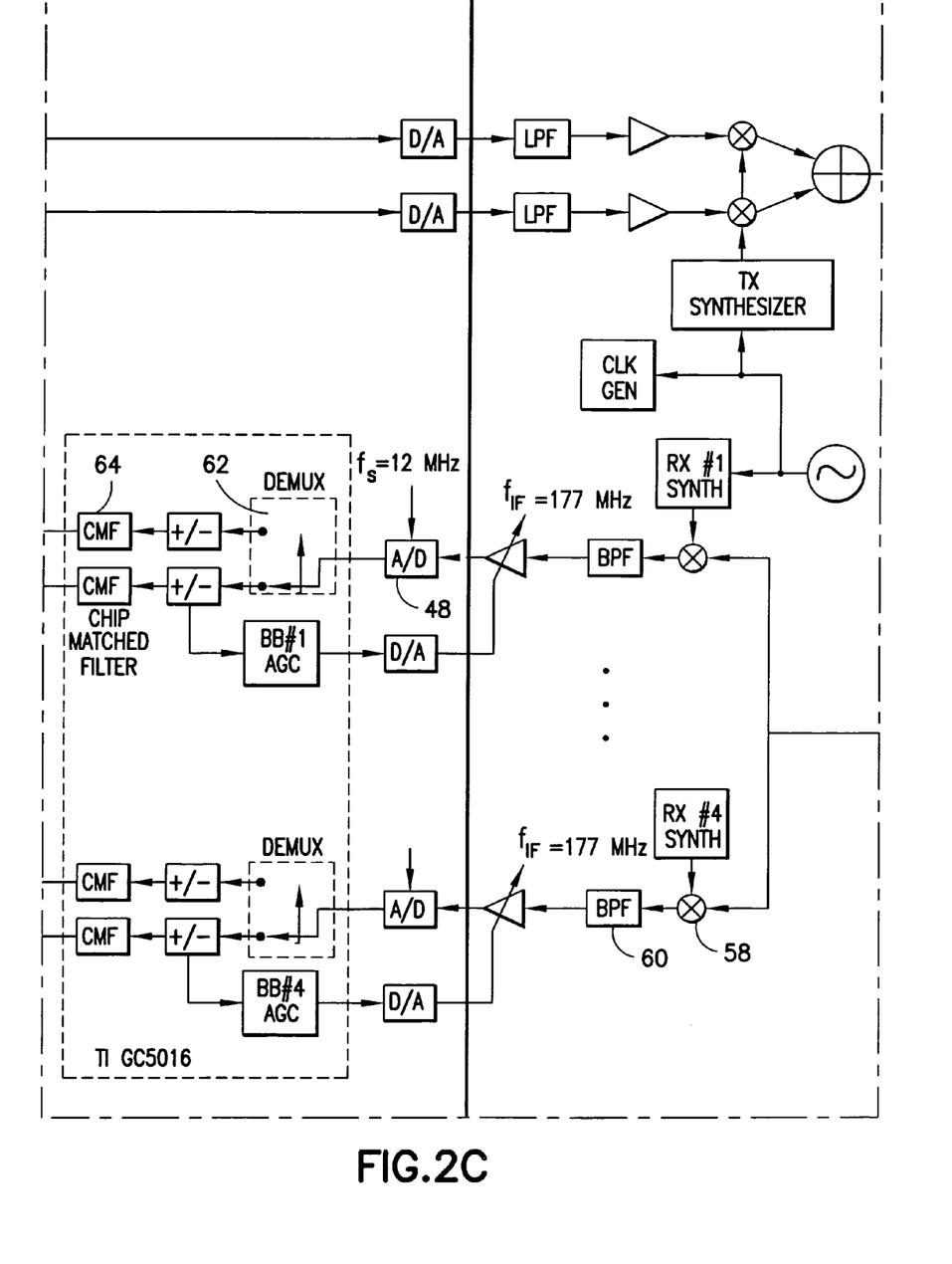
Figure 2D:
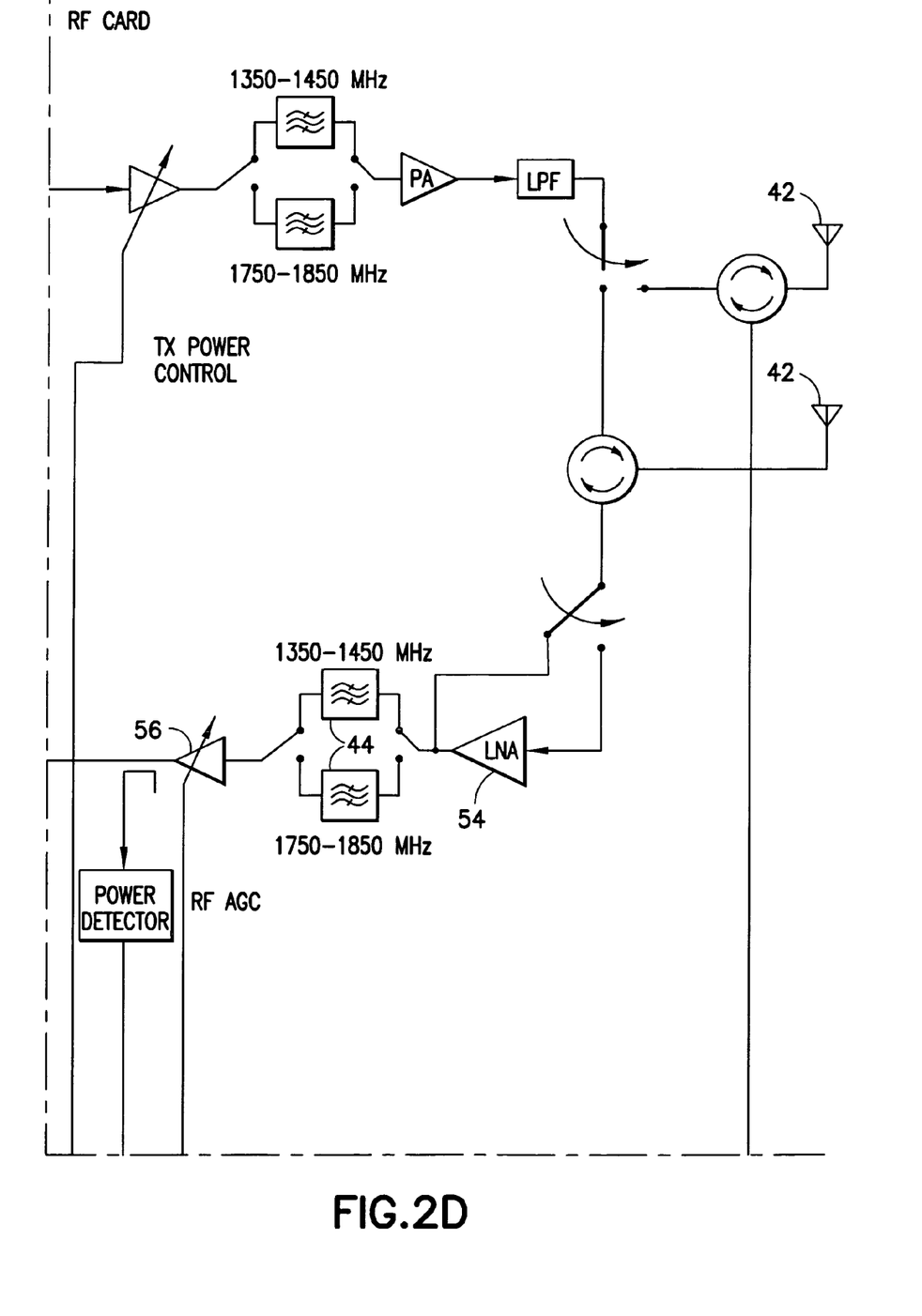
Figure 2E:
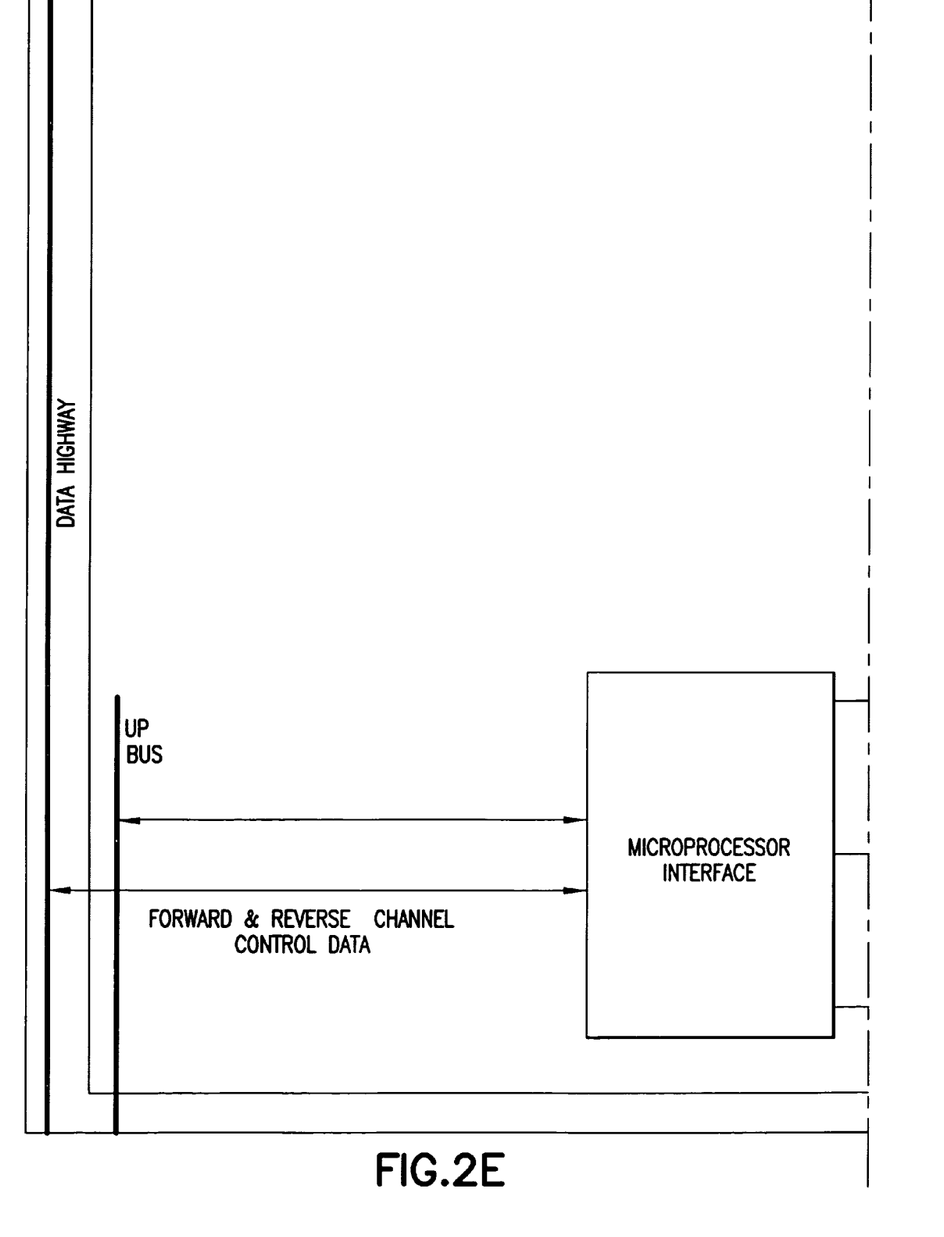
Figure 2F:
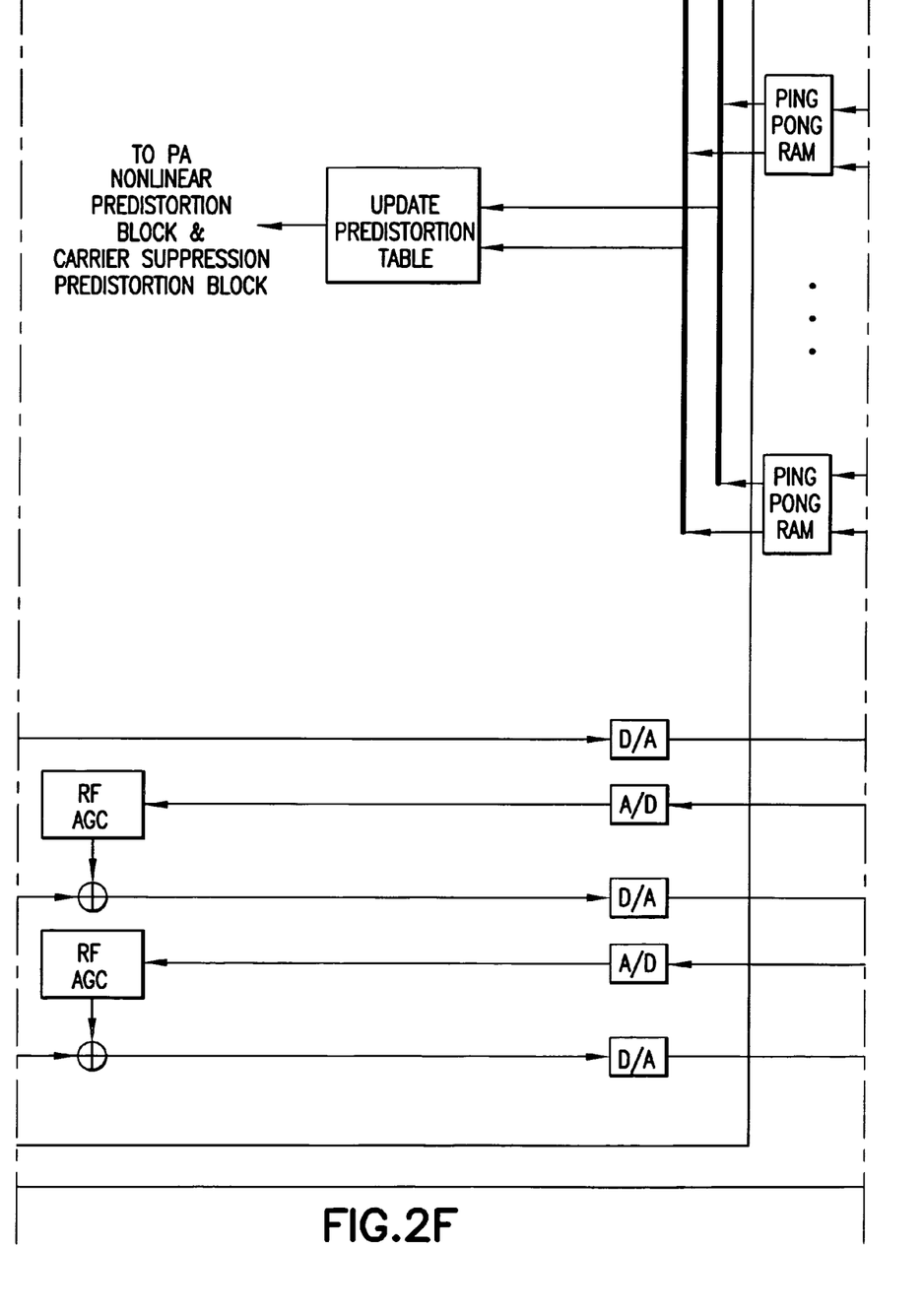
Figure 2G:
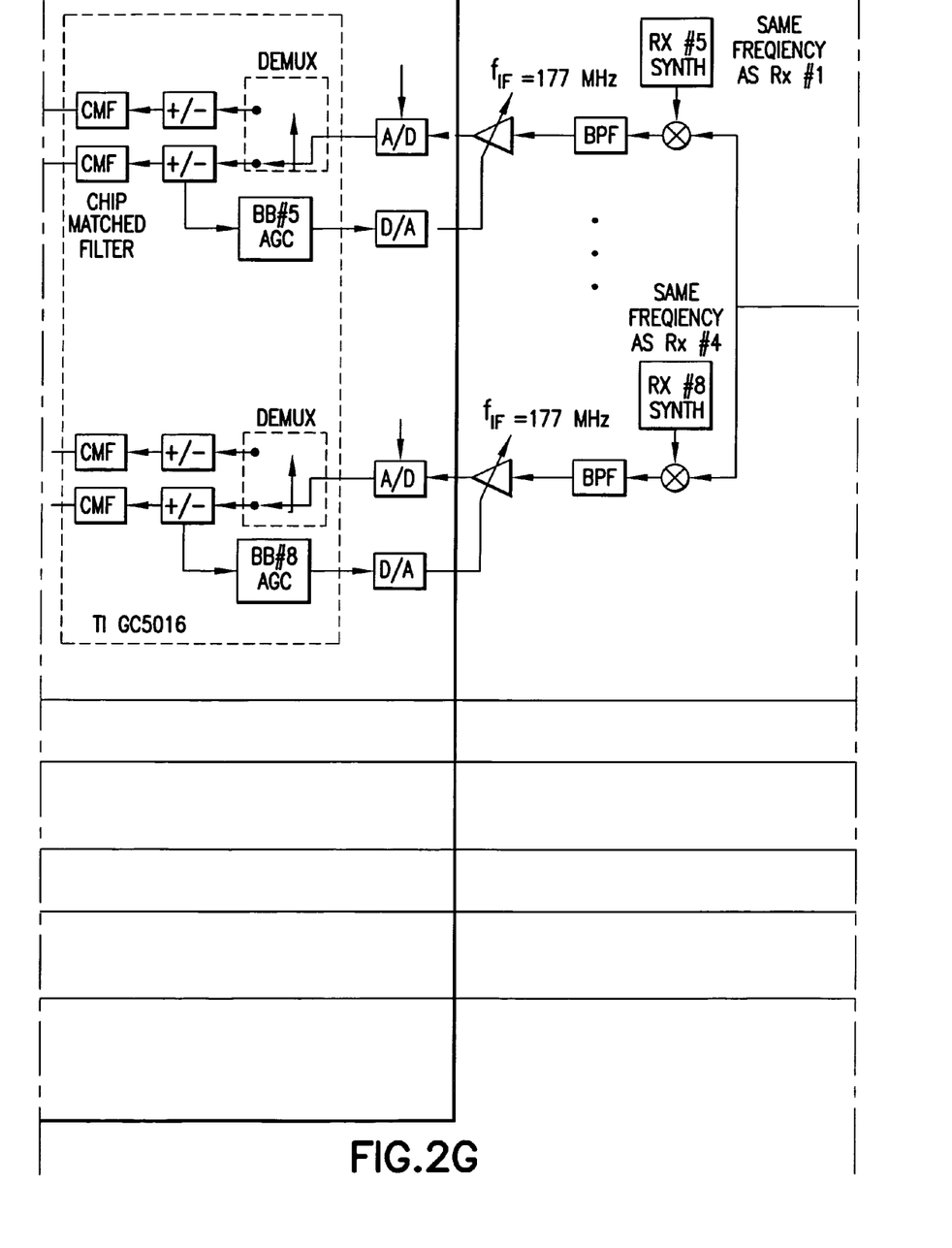
Figure 2H:
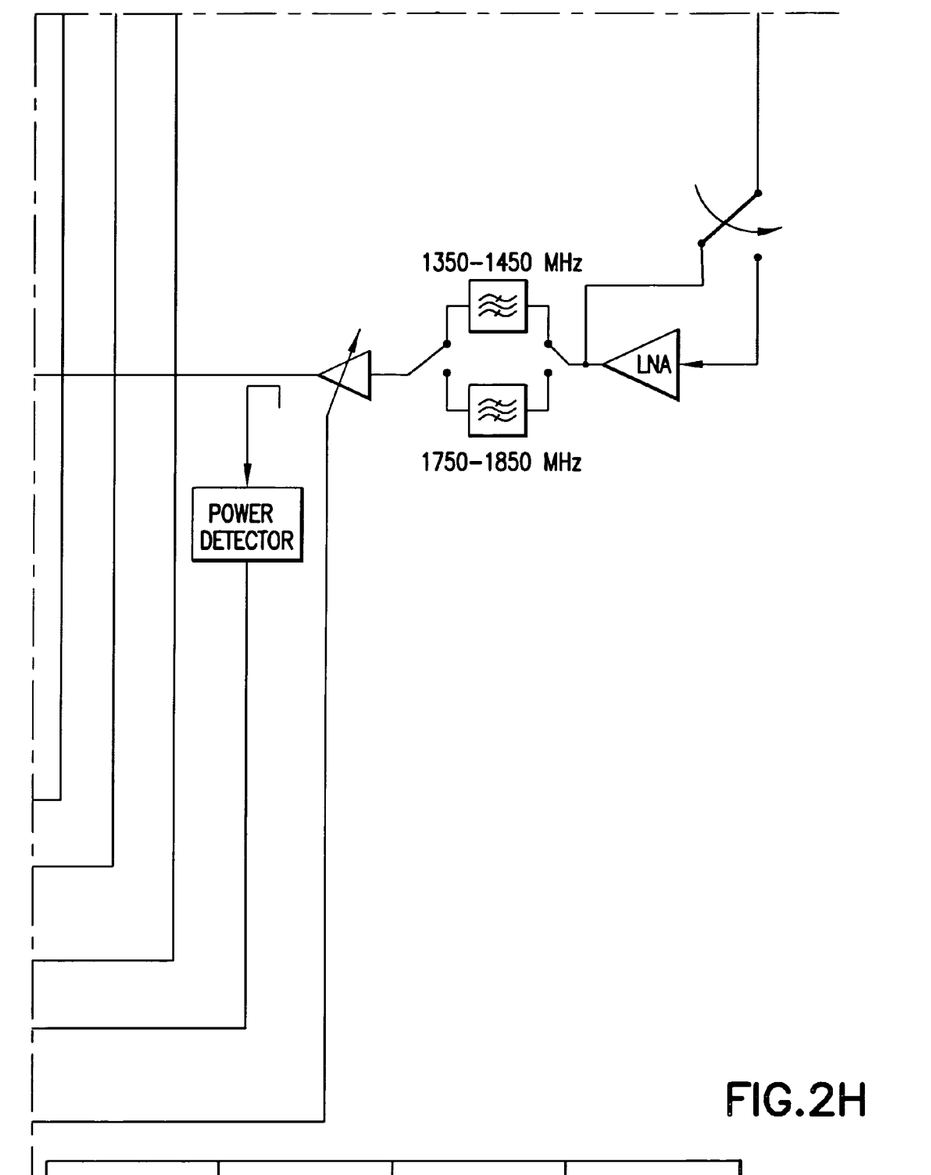

FIG. 2 is a detailed block diagram of the receiver 40 front end. The antenna 42, filters 44, and analog-to-digital converters 48 are known in the art. A modem card 50 includes a field programmable gate array 52. A signal received at the antenna 42 is amplified by a low noise amplifier 54, filtered 44, and again amplified at an automatic gain control circuit 56. Following, it is downconverted 58 to baseband and filtered again at a bandpass filter 60 before being digitally sampled at an analog-to-digital converter 48 on the modem card 50. The signal is then demultiplexed 62, chip-wise filtered 64, and stored in a ping-pong RAM buffer 66. Timing, energy, and noise estimates are taken for each chip at a chip acquisition FIR filter 68, and the chips are despread at a matched filter 70. A MMSE equalizer 72 equalizes the signals output from the matched filter 70, suppressing interference. Carrier phase/frequency estimation is done after multiuser-equalization improves the symbol SNR. Note that the MMSE equalization may be accomplished without knowledge of carrier phase and frequency. In a sense, the signal is at too low a signal to noise ratio to perform carrier phase locking before the multiuser interference is subtracted in the MMSE equalizer 72. After MMSE equalization, the signal to noise ratio of the equalized signal is far higher and carrier locking is then performed at a carrier lock circuit 74.

An important part of certain embodiments of this invention is that the MMSE multiuser receiver operation is performed on the signal that is still rotating at a beatnote frequency, and carrier lock is attempted after the multiuser receiver 40 cleans up the multiuser interference. As an example, if the platforms move in this system (FIG. 1, e.g., a satellite) at a 9000 km/hr rate, and the carrier frequency is 1.3 GHz, then the Doppler shift on the received burst may be up to ±10.8 kHz. If the platforms derive their carrier and chip clocks from a one-ppm reference oscillator, then the total clock uncertainty in the initial acquisition will be roughly ±12 kHz, and ±28 Hz on the 3 Mcps chip clock. Over the duration of an 1800 symbol burst, the chip clock will not drift by more than roughly 0.25 chip, so it is quite conceivable to perform chip lock using the approach described in co-owned U.S. patent application Ser. No. 11/364,990, entitled "Dispersed Pilot Signals for Estimating Timing Delay", filed on Feb. 28, 2006 and hereby incorporated by reference.

After PN code acquisition is performed (such as in the reference incorporated immediately above), then symbol matched filter outputs are supplied to the MMSE multiuser receiver 40. This is one example of many forms of multiuser detection that can be performed at this stage. The MMSE multiuser receiver 40 performs a multiuser equalization 72 on the symbol matched filter 70 outputs to clean up the multiuser interference that corrupted them at those outputs. Let the symbol energy to noise plus multiuser interference ratio at the symbol matched filter outputs be denoted by $E_s/(N_0+I_0)$. The goal of the multiuser receiver 40 is to significantly suppress the interference power, $I_0$. If the multiuser receiver 40 is successful in this, then the carrier lock circuitry 74 can lock to the carrier with the equalized matched filter 70 outputs that have a signal to noise ratio approximately $E_s/N_0$, where the interference power term $I_0$ has been largely eliminated from the denominator.

Preferably, the receiver operates on different sets of user signals within a single burst separately, such as described in co-owned U.S. patent application Ser. No. 11/351,363 entitled "Multi-User Receiver and Method for Successive Acquisition", filed on Feb. 9, 2006 and hereby incorporated by reference. Specifically, the receiver 40 buffers 66 a set of signals received from a plurality of users that are received in one burst. From this buffered set of signals, the receiver 40 operates iteratively on sub-groups of the set of signals, each sub-group including signals received in the burst that are somewhat matched in received power level. The strongest signals are equalized, demodulated despread and decoded, and the transmitted symbols are estimated from those strongest signals. They are then re-spread, subtracted from the full set of buffered signals to yield a modified set of received signals, and the process is repeated for the strongest set of signals remaining within the modified set of signals. This may be continued until all user signals are processed and detected. Upon receipt of the next burst, the entire process is repeated for signals received in that burst.

The specifics are broadly described. Assume that each of the buffered signals is received with a power level that differs from at least some of the other signals. Some but not necessarily all define a unique received power level. These different power levels may be conceptually parsed into power level bands, each having an upper and lower bound, on which the receiver operates as a block. The multiuser receiver 40 first takes from the buffered signals those within the highest power level band, a first group. That these signals are referred to as a group of user signals does not necessitate that there is more than one user signal in a group; each group, or any of the several groups, may have only one user signal within the power level band that defines the group. The multiuser receiver uses the MMSE equalizer 72 to cancel multiuser interference within that first group. As the near-far power imbalance among signals of the first group is limited by the power band concept, the equalizer 72 can dramatically suppress multiuser interference for signals that it processes as a block, those within a single power band. The carrier phase and frequency are then acquired for each user signal within that first group as described above, and they are passed through a combiner, pilot symbol extractor, and decoder to resolve estimated transmitted symbols for each of the multiple user signals within the first group, the highest power level signals of the burst.

These signals may then be further processed conventionally, but are also split into a feedback line 76 where they are re-encoded, re-modulated, and re-spread 78 and subtracted from the original set of buffered signals (all signals originally received in the burst). Term this a modified set of signals, which replaces the set of stored signals in the buffer 66. The modified set of signals is identical to the original except that the signals of the first (highest) power band (on this first iteration) are stripped off. The above process is repeated iteratively on the remaining strongest signals of the modified set (which changes on each iteration) until all signals in all processed power bands are demodulated, despread and detected. Each iteration operates on signals within a progressively lower power band than the previous iteration.

Returning to the carrier lock description, on a given iteration of the detection process described immediately above and in the incorporated reference entitled "Multi-User Receiver and Method for Successive Acquisition", if a user of interest is 12 dB weaker than another user detected by the chip acquisition process described in the incorporated reference entitled "Dispersed Pilot Signals for Estimating Timing Delay", then the $E_s/I_0$ will be roughly −12 dB prior to despreading and $E_s/I_0$=0 dB after despreading with the PN code having a 12 dB processing gain. If the $E_s/N_0$ level of the desired user is $E_s/N_0$=6 dB, then the $E_s/(N_0+I_0)$ ratio will be roughly −1 dB. The process of chip acquisition can be performed on this signal with this SINR if 60 pilot symbols are used for the accumulation, because after this accumulation, the detector will have an SNR of roughly −1 dB+10*$\log_{10}$(60)=16.8 dB. The fact that the chip clock drifts slowly over the 1800 symbol detection window makes this accumulation possible.

Fine timing and amplitude estimation (at an estimation interpolator 80) follows chip acquisition 68. These estimates must be precise in order for the equalizer 72 to produce good interference rejection. Information from all the symbols in the burst are therefore combined to produce these estimates.

The carrier acquisition circuit 74, on the other hand, can only coherently accumulate three pilot symbols in a row, before squaring the accumulated value to determine the energy present in a particular Doppler bin. More than three symbols cannot be accumulated because the carrier clock will drift if the Doppler shift exceeds a tolerable amount in that timeframe and the detection energy will be lost due to destructive signal addition. If the carrier beatnote can be off by ±12 kHz due to a Doppler shift and reference oscillator offset, then in 3 symbols, the constellation of the received signal may rotate by about 65 degrees. This will result in approximately a 0.5 dB loss in the detection SNR. Furthermore, accumulating only three symbols with an SINR of −1 dB will yield a detection SNR of −1 dB+10*$\log_{10}$(3)−0.5 dB=3.3 dB prior to squaring, which is too low to properly determine the carrier phase and frequency. Once squaring occurs, the energy can be averaged with the squared values from other blocks of three symbols to increase the detection SNR. If there are twenty blocks of these three symbols, then the detection SNR increases, but the carrier frequency and phase cannot be extracted from the aggregated signal due to signal squaring.

Carrying this example farther, if the multiuser receiver 40 is able to eliminate the $I_0$ term in the denominator, then the SNR is $E_s/N_0$=6 dB prior to accumulation and squaring. Summing three pilots produces an SNR of roughly 6 dB+10*$\log_{10}$(3)−0.5 dB=10.3 dB. When this value is then squared and summed with twenty other pilot block samples, the detection SNR is high enough to insure a good carrier lock in both frequency and phase.

The present multi-user receiver is particularly well adapted for use in a mesh network such as that shown in FIG. 1, where network nodes may communicate directly when in range of one another or through another relaying network node when not in direct range. A particularly apt waveform for such a mesh network is shown and described in co-owned and co-pending U.S. patent application Ser. No. 11/335,439, entitled "Hybrid Multiple Access Waveform, Method and Apparatus" filed on Jan. 18, 2006 and herein incorporated by reference.

Figure 3:
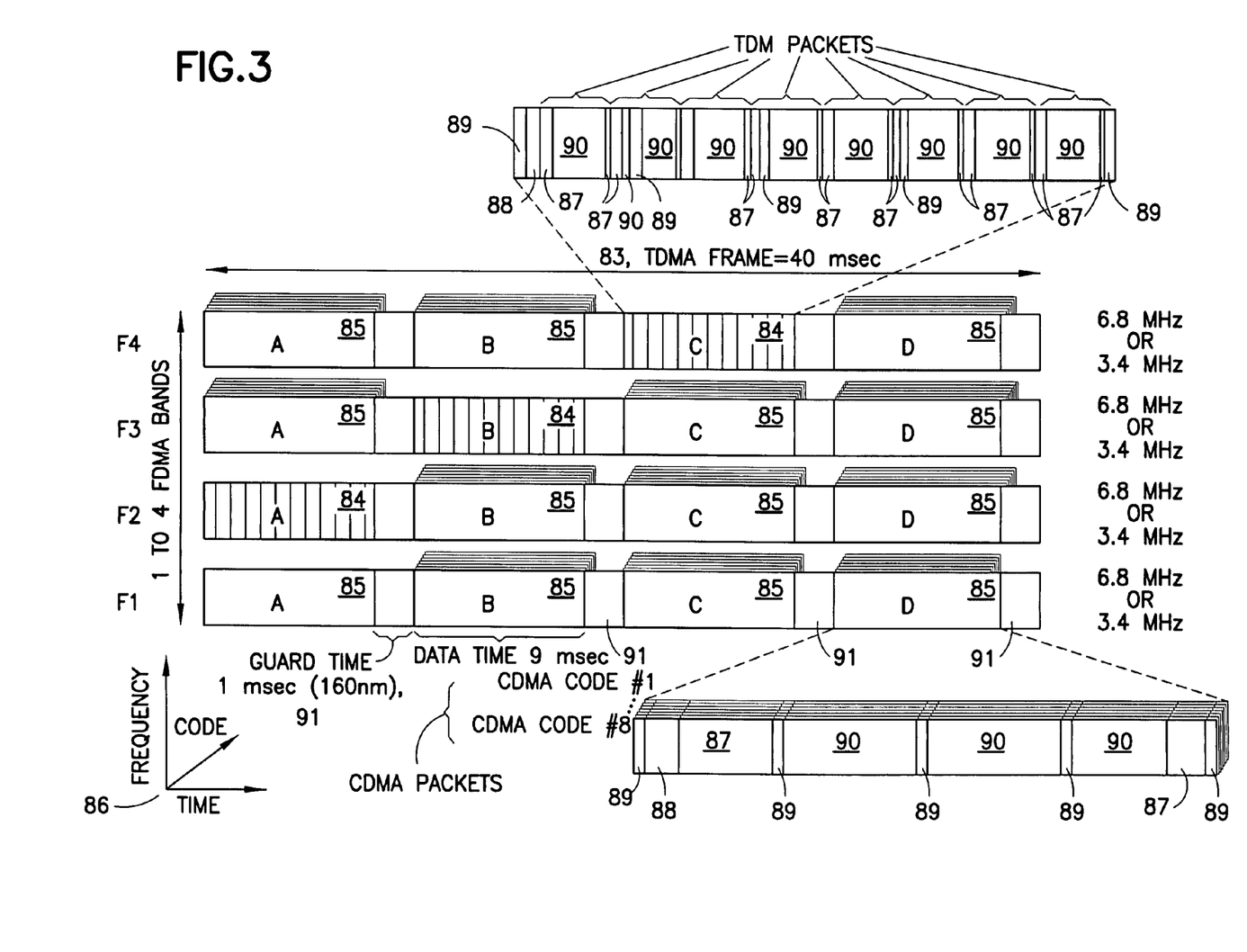
FIG. 3 is a schematic diagram of a hybrid waveform particularly adapted for a mesh network, in which the inventive multiuser receiver may operate.

The multiple access waveform of the above-incorporated application is shown in FIG. 3, where various users may access the communication system by one of at least two modes. A frame 83, preferably 40 msec in duration, includes time-partitioned bursts 84 and code-partitioned bursts 85, by which the respective bursts are partitioned for multiple access via a first time mode or a second spreading code mode. Shown are four time slots A-D in each of four different frequency bands F1-F4. As indicated by the axes legend 86, time distinction is along the horizontal, frequency distinction is along the vertical, and code distinction is along an axis perpendicular to the page. The communication spectrum that is available for use in the mesh network system is first parsed according to a frequency division like FDMA into four different frequency bands, F1, F2, F3, and F4. The spectrum in each of the frequency bands F1-F4 is then parsed into a series of time slots A, B, C, D. The time slots A-D of the different frequency bands F1-F4 are synchronous and preferably separated by a guard interval 91. They are synchronous in order that access may be via either of the two modes simultaneously. That is, multiple access may be obtained in a first time slot A of one frequency band F1 via code slots, and in that same first time slot A of another frequency band F2 via time division multiplexing. Synchronous time slots also enables multiple access into sequential time slots of one frequency band by different modes, such as time sub-slots in time slot A of frequency band F2 and code slots in time slot B of that same frequency band F2.

The particular modes of multiple access are detailed in FIG. 3. Consider the time slot C of the frequency band F4 (slot C/F4), which is shown in exploded view in FIG. 3. A total of eight time sub-slots are available, for use by up to eight different users within that overall C/F4 slot of time/frequency. Various spectrum allowances are indicated for overhead 87, network control and maintenance 88, and acquisition of pilot signals 89. What remains are eight payloads 90 within slot C/F4 that may carry data from each of eight different users. Of course, less active users within a particular slot C/F4 might entail more than one payload 90 carrying data from one user so as not to waste the spectrum. However, partitioning of the time slot according to the first mode into time sub-slots supports a maximum number of disparate users, preferably eight.

Now consider the time slot D of the frequency band F1 (slot D/F1), which is also shown in exploded view in FIG. 3. A total of eight code slots are available, for use by up to eight different users within that overall D/F1 slot of time/frequency. A code slot is a spread spectrum portion of the time/frequency bounded slot 85 that allows spread spectrum multiple access within the confines of that overall time slot 85, and is depicted as one layer of the eight depicted layers for each of the code-partitioned time slots 85. Various spectrum allowances are again indicated for overhead 87, network control and maintenance 88, and acquisition of pilot signals 89. What remains are three payloads 90 within each code slot of the overall time slot D/F1 that carry data from a single user in that code slot. That is, while the payload for a single code slot may be interrupted by non-payload data, only one user accesses the network via a single code slot of a time slot 85. The code-partitioned time slots 85 enable up to the maximum number of (preferably eight) multiple users via different spreading codes. Preferably, both the first and second modes support the same maximum number of disparate users. The MRW's ability to carry eight messages per time-frequency slot in the first or second modes of operation allows communication at 800 messages per second in each frequency band in both standard and relay configurations, even where both communicating nodes are not ground based.

The receiver 40 of the above-described exemplary embodiments of the invention is particularly well adapted to such a hybrid waveform as in FIG. 3, though it operates equally well in a traditional CDMA system as in the code-partitioned slots 85 of FIG. 3.

While there has been illustrated and described what is at present considered to be preferred and alternative embodiments of the claimed invention, it will be appreciated by those skilled in the art that numerous changes and modifications are likely to occur. It is intended in the appended claims to cover all those changes and modifications that fall within the spirit and scope of the claimed invention.

What is claimed is:

1. A method for acquiring a user signal from among several user signals received from multiple users in a single burst, comprising:
   receiving at a radio receiver a plurality of user signals in a single transmission burst;
   suppressing at the radio receiver multiuser interference among at least some of the plurality of received user signals by performing a multiuser minimum mean-square-error equalization on symbol matched filter outputs; and
   determining at a radio receiver a carrier frequency of at least one signal from among the interference suppressed plurality of received user signals.

2. The method of claim 1, wherein suppressing the multiuser interference is among all signals received in the single transmission burst.

3. The method of claim 1, wherein at least some of the plurality of received user signals exhibit a rotating frequency while multiuser interference is being suppressed.

4. The method of claim 1, wherein the method is executed by the radio receiver which comprises:
   an antenna for receiving the plurality of user signals;
   a matched filter bank that has an input coupled to an output of the antenna for despreading the plurality of received user signals;
   a multiuser equalizer having an input coupled to an output of the matched filter bank for suppressing the multiuser interference; and
   a carrier lock circuit having an input coupled to an output of the multiuser equalizer for determining the carrier frequency of the at least one signal from among the interference suppressed plurality of received user signals.

5. The method of claim 1, wherein the radio receiver comprises a non-coherent receiver in which carrier lock is not required for interference suppression.

6. A method for acquiring a user signal from among several user signals received from multiple users in a single burst, comprising:
   receiving at a radio receiver a plurality of user signals in a single transmission burst;
   suppressing at the radio receiver multiuser interference among at least some of the plurality of received user signals by performing a multiuser minimum mean-square-error equalization on symbol matched filter outputs; and
   determining at a radio receiver a carrier frequency of at least one signal from among the interference suppressed plurality of received user signals by coherently accumulating at least two pilot symbols and squaring the accumulated value.

7. The method of claim 6 wherein determining a carrier frequency comprises coherently accumulating no more than three pilot symbols and squaring the accumulated value.

8. The method of claim 6 wherein determining a carrier frequency comprises, for each of several of the plurality of user signals, coherently accumulating no more than three pilot symbols and squaring the accumulated value, and further comprising averaging the squared values to increase a signal to noise ratio.

9. The method of claim 6 wherein the at least some of the plurality of received user signals exhibit a rotating frequency while multiuser interference is being suppressed, said rotation not exceeding about 65 degrees while the at least two pilot symbols are being coherently accumulated.

10. A multiuser receiver for acquiring a user signal from among several user signals received from multiple users in a single burst, comprising:
    an antenna for receiving a plurality of user signals in a single spread spectrum transmission burst;
    a matched filter having an input coupled to an output of the antenna for despreading the received user signals;
    a multiuser equalizer having an input coupled to an output of the matched filter for suppressing mutual interference among at least a portion of the plurality of user signals; and
    a carrier lock circuit having an input coupled to an output of the multiuser equalizer for determining a carrier frequency of at least one user signal of the portion.

11. The multiuser receiver of claim 10 further comprising a chip acquisition FIR filter disposed between the antenna and the equalizer for estimating timing and amplitude for the portion of the user signals.

12. The multiuser receiver of claim 10 wherein the multiuser equalizer operates to suppress mutual interference among at least a portion of the plurality of user signals while the portion rotates in frequency.

13. The multiuser receiver of claim 12 wherein the multiuser equalizer operates to suppress mutual interference among all of the plurality of user signals.

14. The multiuser receiver of claim 10 wherein the carrier lock circuit comprises an accumulator for accumulating energy of at least two pilot symbols and a multiplier for squaring the accumulated energy value.

15. The multiuser receiver of claim 10 wherein the carrier lock circuit comprises an accumulator for accumulating energy of no more than three pilot symbols and a multiplier for squaring the accumulated energy value.

16. The multiuser receiver of claim 10 wherein the carrier lock circuit comprises, for each of the portion of the plurality of user signals, an accumulator for accumulating energy of no more than three pilot symbols and a multiplier for squaring the accumulated energy value, the carrier lock circuit further comprising an averaging sub-circuit for averaging the squared accumulated energy values.

17. The multiuser receiver of claim 10 wherein the carrier lock circuit comprises an accumulator for accumulating energy of at least two pilot symbols and a multiplier for squaring the accumulated energy value, and the multiuser equalizer operates to suppress mutual interference among at least a portion of the plurality of user signals while the portion rotates in frequency, said rotation not exceeding about 65 degrees while the at least two pilot symbols are accumulated.

18. The multiuser receiver of claim 10, wherein the multiuser receiver comprises a non-coherent receiver in which carrier lock is not required for interference suppression.

\* \* \* \* \*